United States Patent
Jusselin et al.

[11] Patent Number: 5,913,605
[45] Date of Patent: Jun. 22, 1999

[54] ROTARY LOCK SYSTEM FOR WEAR RUNNER ASSEMBLY

[75] Inventors: Paul G. Jusselin, Irving; Howard W. Robinson, Grapevine, both of Tex.

[73] Assignee: G. H. Hensley Industries, Inc., Dallas, Tex.

[21] Appl. No.: 08/932,247

[22] Filed: Sep. 17, 1997

[51] Int. Cl.⁶ ............................................. E02F 9/28
[52] U.S. Cl. .......................... 37/451; 37/456; 403/320; 403/348; 403/380; 403/409.1; 172/772
[58] Field of Search ........................... 37/451, 453, 455, 37/456, 458; 403/320, 316, 348, 380, 409.1; 172/772, 772.5

[56] References Cited

U.S. PATENT DOCUMENTS

| | | | |
|---|---|---|---|
| Re. 33,454 | 11/1990 | Potter | 37/135 |
| 329,586 | 11/1885 | Montress | 403/348 X |
| 330,414 | 11/1885 | Moyer | 403/348 X |
| 1,563,404 | 12/1925 | Schulte | 37/456 X |
| 1,765,943 | 6/1930 | Schmidt | 403/320 X |
| 1,808,311 | 6/1931 | Madonna | 37/456 |
| 1,817,834 | 8/1931 | Orme | 403/348 X |
| 1,834,514 | 12/1931 | Brune | 37/456 |
| 1,885,231 | 11/1932 | Chong et al. . | |
| 2,110,135 | 3/1938 | Douglas | 403/348 X |
| 2,313,216 | 3/1943 | Blanchard | 37/456 X |
| 3,307,893 | 3/1967 | Williams | 403/320 X |
| 3,860,209 | 1/1975 | Strecker | 403/348 X |
| 4,057,294 | 11/1977 | Krekeler | 299/93 |
| 4,067,657 | 1/1978 | Kaarlela | 37/456 X |
| 4,104,951 | 8/1978 | Leitner | 403/409.1 X |
| 4,632,195 | 12/1986 | Emmerich | 403/348 X |
| 4,662,024 | 5/1987 | Moench | 403/348 X |
| 4,682,906 | 7/1987 | Rückert et al. | 403/409.1 |
| 4,716,666 | 1/1988 | Potter | 37/135 |
| 4,882,980 | 11/1989 | Arino et al. | 403/320 X |
| 4,995,176 | 2/1991 | Briscoe et al. | 37/141 R |
| 5,005,304 | 4/1991 | Briscoe et al. | 37/141 R |
| 5,056,243 | 10/1991 | Sprunger et al. | 37/115 |
| 5,063,695 | 11/1991 | Briscoe et al. | 37/141 R |
| 5,068,986 | 12/1991 | Jones | 37/142 A |
| 5,077,918 | 1/1992 | Garman | 37/141 R |
| 5,088,214 | 2/1992 | Jones | 37/141 R |
| 5,133,617 | 7/1992 | Sokn et al. | 403/348 X |
| 5,233,770 | 8/1993 | Robinson | 403/348 X |
| 5,233,912 | 8/1993 | Mueller | 403/348 X |
| 5,241,765 | 9/1993 | Jones et al. | 37/398 |
| 5,257,874 | 11/1993 | Kato et al. | 403/348 X |
| 5,261,758 | 11/1993 | Vranish | 403/348 |
| 5,272,824 | 12/1993 | Cornelius | 37/456 X |
| 5,404,828 | 4/1995 | Tesney | 403/320 X |

(List continued on next page.)

Primary Examiner—Christopher J. Novosad
Attorney, Agent, or Firm—Konneker & Smith, P.C.

[57] ABSTRACT

A wear runner assembly includes a base which is representatively secured to an excavating bucket wall surface, and a wear runner which is releasably connectable to the base by moving the wear runner in a locking direction parallel to the surface to engage tongues on the base with grooves on the wear runner and thereby prevent removal of the wear runner from the base in a removal direction transverse to the surface and the locking direction. By moving the wear runner relative to the base in an unlocking direction opposite to the locking direction the connected wear runner may then be moved in the removal direction to separate the wear runner from the base. To prevent movement of the wear runner in this unlocking direction and corresponding uncoupling of the wear runner from the base, a generally cylindrical locking pin member is inserted in aligned openings in the wear runner and the base and rotated about an axis parallel to the removal direction to cause thread-like external projections on the locking pin to enter corresponding grooves in the base to prevent shifting of the wear runner relative to the base in the unlocking direction. As the locking pin is rotated into place it causes a resilient detent pin structure on the base to snap into a corresponding depression on the pin to releasably prevent the pin from being rotationally backed out of the aligned base and wear member openings.

33 Claims, 4 Drawing Sheets

U.S. PATENT DOCUMENTS

| | | | |
|---|---|---|---|
| 5,435,084 | 7/1995 | Immel | 403/320 X |
| 5,469,648 | 11/1995 | Jones et al. | 37/457 |
| 5,480,253 | 1/1996 | Ljungberg | 403/409.1 |
| 5,564,206 | 10/1996 | Ruvang | 37/456 X |
| 5,593,265 | 1/1997 | Kizer | 403/348 X |
| 5,597,260 | 1/1997 | Peterson | 403/348 X |
| 5,607,251 | 3/1997 | Rafn | 403/348 |
| 5,626,435 | 5/1997 | Wohlhüter | 403/348 |
| 5,645,365 | 7/1997 | Malish et al. | 403/348 |
| 5,647,591 | 7/1997 | Parsons | 403/320 X |
| 5,666,748 | 9/1997 | Emrich et al. | 37/455 X |
| 5,681,127 | 10/1997 | Willen | 403/409.1 X |
| 5,709,043 | 1/1998 | Jones et al. | 37/455 X |
| 5,765,301 | 6/1998 | Clendenning | 37/455 X |
| 5,791,809 | 8/1998 | Bessey | 403/348 |

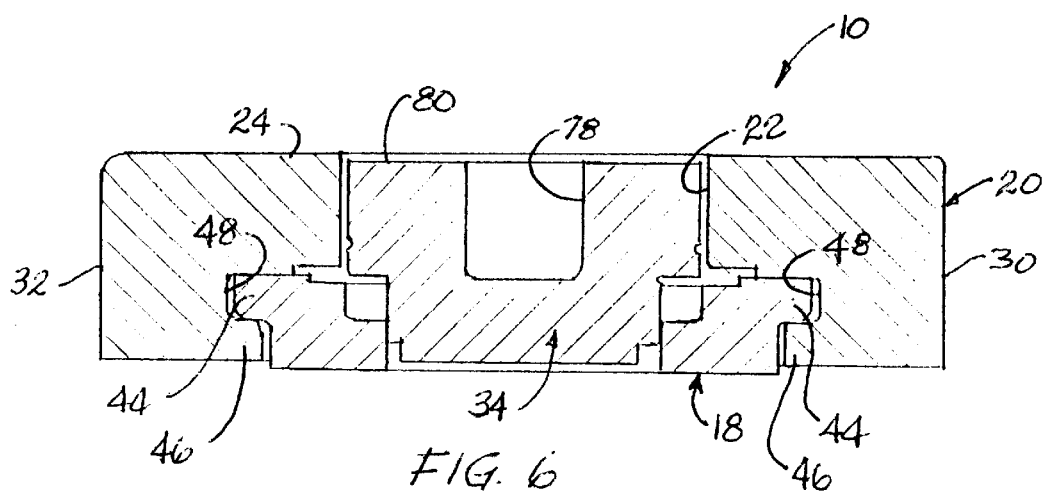
FIG. 6
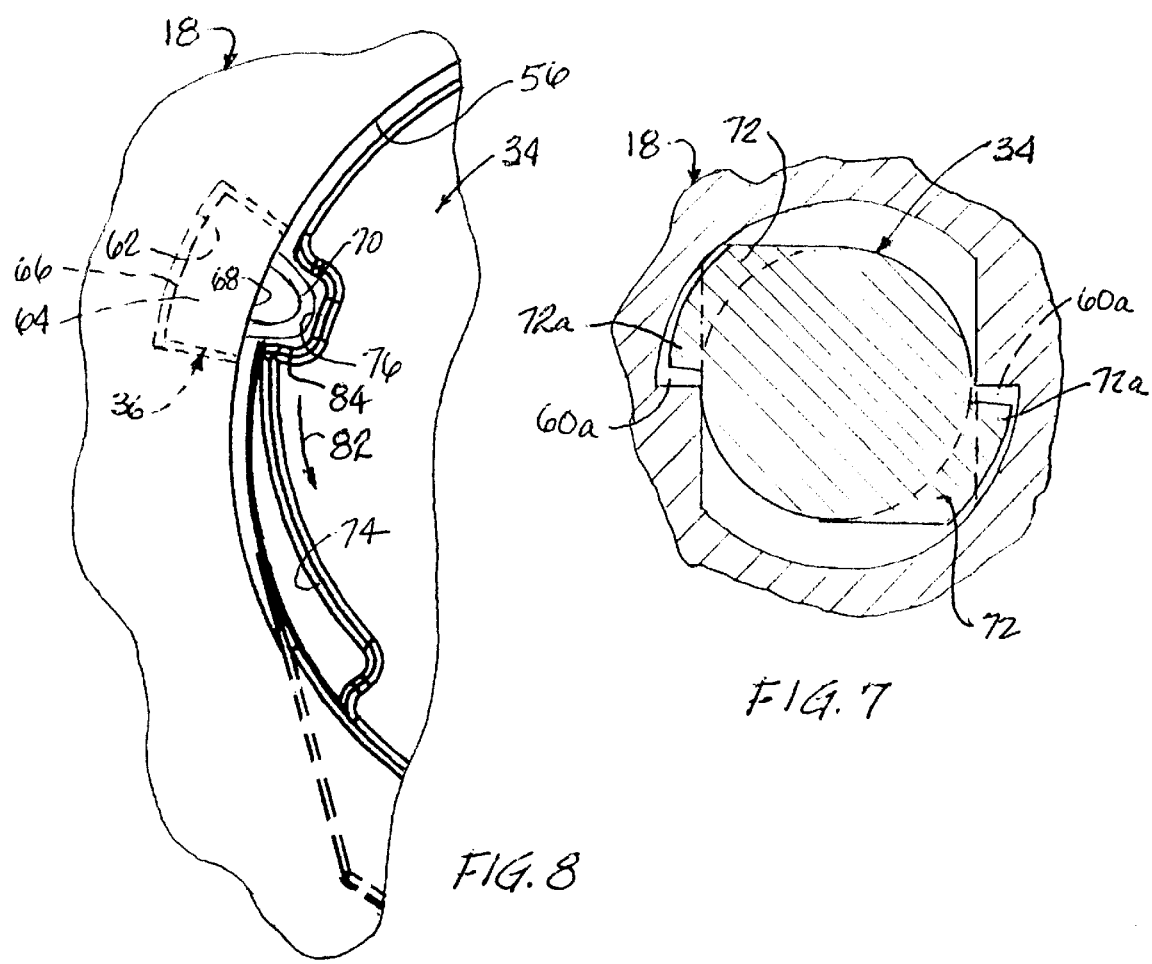
FIG. 7
FIG. 8 ns to inhibit
ROTARY LOCK SYSTEM FOR WEAR RUNNER ASSEMBLY

BACKGROUND OF THE INVENTION

The present invention generally relates to earth working apparatus and, in a preferred embodiment thereof, more particularly relates to wear runner structures for inhibiting surface abrasion wear to earth working apparatus such as excavating buckets and the like.

Wear runner assemblies are commonly installed on various surfaces of earth working structures, such as excavating buckets, to inhibit abrasion wear on such surfaces during use of the earth working structures. A typical wear runner assembly includes a base which is welded or otherwise anchored to the surface to be shielded from abrasion wear, and a wear runner member or shroud which is positioned over the base and releasably interlocked therewith. To hold the wear member on the base during use of the earth working structure, a separate locking mechanism is used to fasten the wear member to the base and maintain the wear member in an interlocked relationship with the base until removal of the wear member from the base is desired.

Various problems, limitations and disadvantages have typically been associated with wear member/base locking mechanisms of conventional construction. For example, some conventional locking mechanisms must be forcibly struck to dislodge them, thereby creating a potential safety hazard. Other types of conventional locking mechanisms can be dislodged during earth working operations, thereby causing the wear member to fall off its underlying base structure, or can seize up in a manner requiring them to be burned off to permit removal of the wear runner from its associated base. Additionally, many locking mechanisms tend to be tedious and time-consuming to remove and install. Still other types of conventional locking mechanisms, such as bolts extended through the wear runner, the base, and the underlying earth working structure wall, undesirably require access to opposite sides of the earth working structure wall for installation and removal of the wear runner.

As can readily be seen from the foregoing, a need exists for an improved wear runner assembly having a wear member/base locking mechanism which eliminates or at least substantially reduces the above-mentioned problems, limitations and disadvantages commonly associated with conventional locking mechanisms. It is accordingly an object of the present invention to provide such an improved wear runner assembly.

SUMMARY OF THE INVENTION

In carrying out principles of the present invention, in accordance with a preferred embodiment thereof, an earth working structure, representatively an excavating bucket, has a wall portion with a surface thereon and is provided with a specially designed wear assembly operative to inhibit abrasion wear on the wall surface during use of the earth working structure.

The wear assembly includes a base structure anchorable to the wall surface and having a first opening therein, and a wear member, representatively a generally cap-shaped wear runner, positionable on the base structure. The wear member is releasably lockable to the base structure, to prevent removal therefrom in a removal direction transverse to the wall surface, in response to movement of the wear member relative to the base structure in a locking direction parallel to the wall surface in a manner generally aligning the first and second openings.

A locking member portion of the wear assembly is insertable into the aligned first and second openings to block movement of the wear member relative to the base structure in an unlocking direction opposite from the locking direction. The locking member is rotatable in the aligned first and second openings about an axis parallel to the removal direction, and is configured to responsively interlock with one of the base structure and the wear member in a manner releasably preventing removal of the locking member from the aligned first and second openings.

The wear assembly also includes a holding structure for retaining the inserted locking member within the first and second openings by releasably preventing rotation of the inserted locking member relative to the base structure and the wear member in a second direction opposite from the first direction.

Representatively, the base structure has tongues thereon which are removably receivable in corresponding grooves in the wear member to releasably lock the wear member to the base structure, and the holding structure is a detent structure operative to block rotation of the inserted locking member relative to the base structure and the wear member in the aforementioned second direction.

In a preferred embodiment thereof, the detent structure includes a first recess formed in the side surface of the first opening, a second recess formed in the locking member and rotatable into a facing relationship with the first recess when the locking member is rotated in the first direction in the first and second openings, and a resilient pawl structure having a first portion receivable in the first recess, and a second portion receivable in the second recess.

Representatively, the locking member has a ramped side surface portion configured to compress the resilient pawl structure, and then cause the second portion thereof to snap into the second recess, as the locking member is rotated in the first direction in the first and second openings. The second recess preferably has a surface thereon which is positioned and configured to cammingly drive the second portion of the resilient pawl structure out of the second recess in response to forced rotation of the locking member in the second direction within the first and second openings.

To facilitate this removal rotation of the locking member the locking member is preferably provided with a socketed head portion configured to receive a tool operative to rotationally drive the locking member in the second direction within the first and second openings to remove the locking member therefrom. Additionally, the locking member is configured to be at least slightly recessed into the second opening when the locking member is operatively retained in the first and second openings by the holding structure.

In a preferred configuration thereof, the locking member has a cylindrical body with an outer side surface, and a plurality of projections form on such outer side surface. The side surface of the first opening has a spaced plurality of grooves formed therein and positioned and configured to complementarily receive the projections in response to rotation of the locking member in the first direction within the first and second openings. Preferably, the projections have generally thread-like configurations and are circumferentially spaced apart from one another.

BRIEF DESCRIPTION OF THE DRAWINGS

FIG. 6 is an enlarged scale cross-sectional view through the installed assembly taken along line 6—6 of FIG. 1;

FIG. 7 is an enlarged scale partial cross-sectional view through the installed assembly taken along line 7—7 of FIG. 1; and FIG. 8 is an enlarged scale partial bottom side elevational view of the installed assembly shown in FIG. 1.

DETAILED DESCRIPTION

Figure 1:
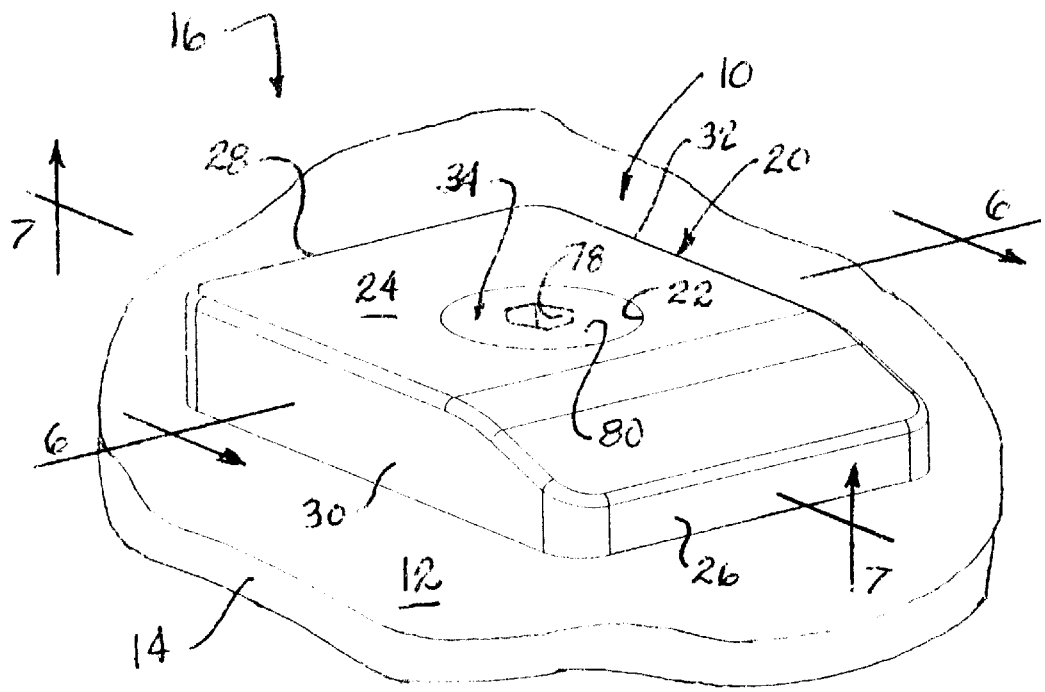
FIG. 1 is a perspective view of a specially designed wear runner assembly which embodies principles of the present invention and is illustrated as being representatively installed on a side surface of an excavating bucket wall.
Figure 3:
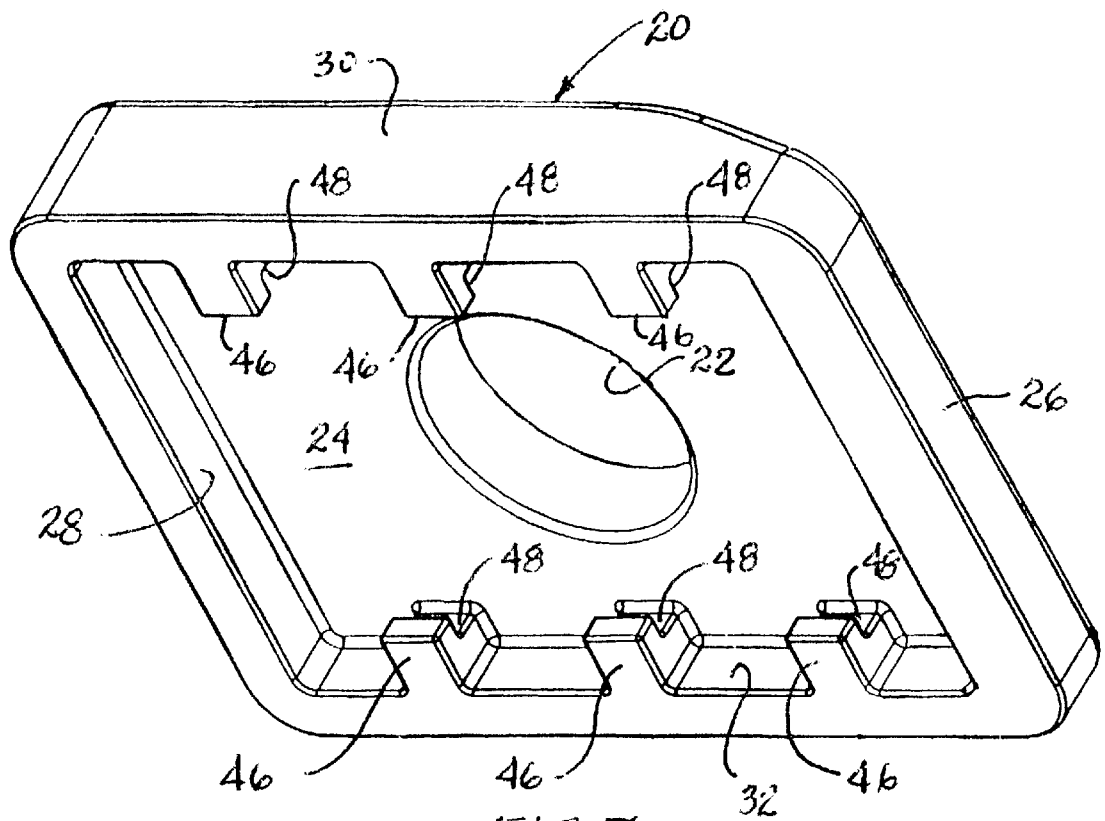
FIG. 3 is a bottom side perspective view of a wear runner member portion of the assembly shown in FIG. 2.
Figure 2:
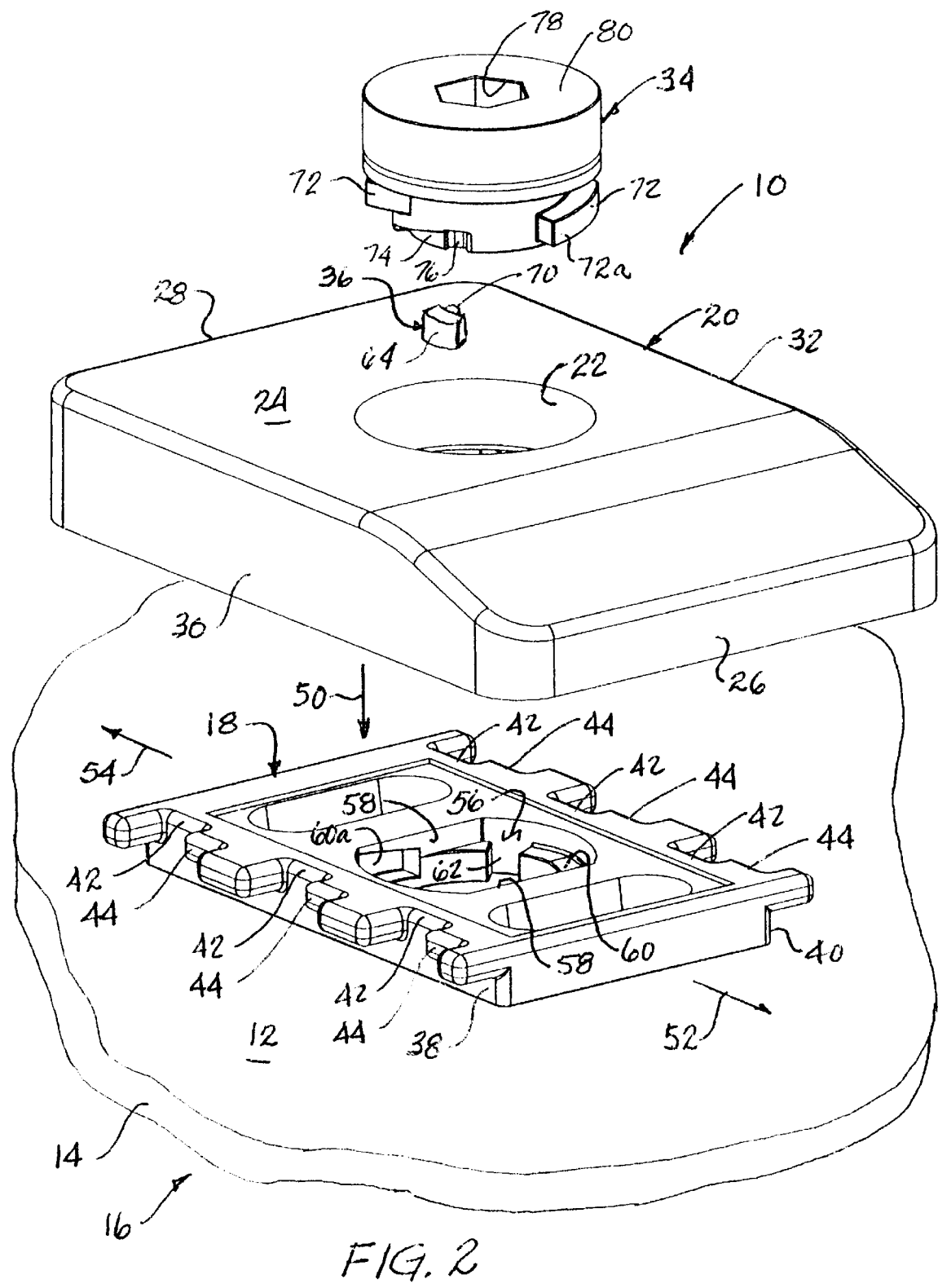
FIG. 2 is an enlarged scale exploded perspective view of the wear runner assembly.

Referring initially to FIGS. 1–3, the present invention provides a specially designed wear runner assembly 10 which, as best illustrated in FIG. 1, is mountable on a side surface 12 of, for example, a wall portion 14 of an earth working structure such as the partially illustrated excavating bucket 16 to inhibit abrasion wear of the surface 12 during use of the earth working structure.

Assembly 10 includes (1) a generally rectangular metal base 18 which is welded or otherwise suitably anchored to the surface 12; (2) a generally rectangular wear member in the form of a shroud or wear runner 20 having a generally cap-shaped configuration, a circular opening 22 extending centrally through its top side wall 24, front and rear end walls 26,28 depending from the periphery of the top side wall 24, and left and right side walls 30,32 depending from the periphery of the top side wall 24; (3) a generally cylindrical rotary locking member 34; and (4) a resilient locking pawl structure 36.

Figure 4:
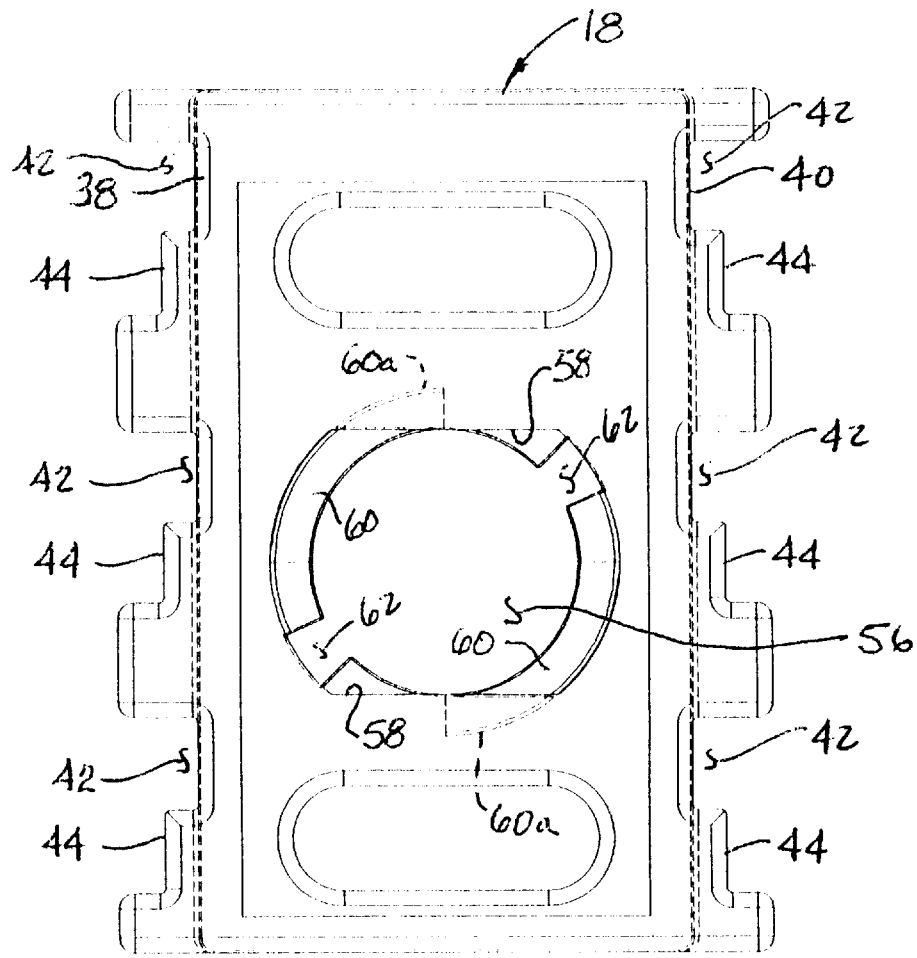
FIG. 4 is an enlarged scale top plan view of a base portion of the assembly shown in FIG. 2.

As best illustrated in FIGS. 2 and 4, the base 18 has formed along opposite left and right sides 38,40 thereof a spaced series of indentations 42 which are each contiguous with an associated locking projection or tongue 44. Each of the depending left and right depending side walls 30 and 32 of the wear runner 20 (see FIG. 3) has a spaced series of horizontally inwardly extending locking projections 46 that define grooves 48 (see FIGS. 3 and 6) between the projections 46 and the underside of the top side wall 24 of the wear runner 20.

To mount the wear runner 20 on the base 18, the wear runner 20 (bottom side down) is pushed down over the underlying base 18, as indicated by the arrow 50 in FIG. 2, in a manner causing the wear runner projections 46 (see FIG. 3) to pass downwardly through the base indentations 42 (see FIGS. 2 and 4). The wear runner 20 is then moved forwardly in a locking direction, as indicated by the arrow 52 in FIG. 2, to cause the base tongues 44 to enter the wear runner grooves 48 as shown in FIG. 6. This causes the wear runner projections 46 to underlie the base tongues 44 in a manner preventing the separation of the wear runner 20 from the base 18 in an upward removal direction until the wear runner 20 is moved rearwardly relative to the base 18 in an unlocking direction as indicated by the arrow 54 in FIG. 2.

The forward locking movement of the wear runner 20 relative to the underlying base 18 aligns the circular wear runner opening 22 with a partially circular opening 56 in the base 18 (see FIGS. 2 and 4), the opening 56 having a diametrically opposite pair of flat sides 58. As best illustrated in FIG. 4, a diametrically opposite pair of upwardly facing, helically ramped surfaces 60 are disposed within the opening 56, and have lower groove end portions 60a that extend beneath and radially outwardly beyond the flat side portions 58 of the opening 56.

Figure 5:
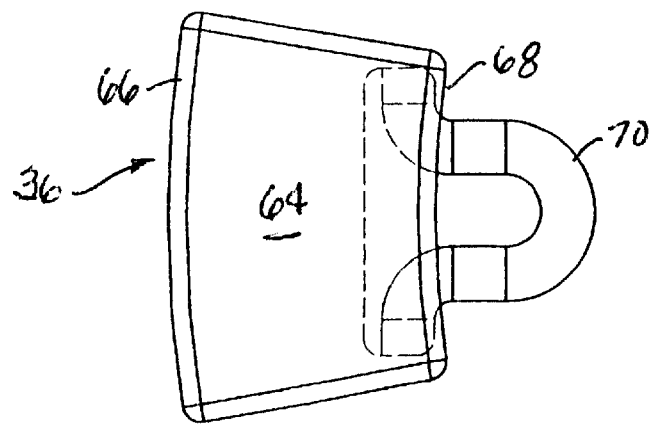
FIG. 5 is an enlarged scale top plan view of a locking pawl portion of the assembly shown in FIG. 2.

Positioned between facing ends of the upwardly facing, circumferentially extending surfaces 60 are a diametrically opposite pair of generally trapezoidally shaped pocket areas 62 (see FIGS. 2, 4 and 8). The resilient locking pawl structure 36 (see FIG. 5) has a generally trapezoidally shaped elastomeric body portion 64 with curved opposite outer and inner sides 66 and 68. Projecting outwardly from the somewhat shorter inner side 68 is an arcuate metal detent member 70. Prior to the initial interlocking of the wear runner 20 with the base 18 as described above, the body portion 64 is positioned within one of the complementarily configured base pocket areas 62 (see FIG. 8) with the detent member 70 projecting radially inwardly beyond the side surface of the base opening 56.

Turning now to FIGS. 2 and 7, on a bottom end portion thereof the cylindrical locking member 34 has a diametrically opposite pair of axially ramped, circumferentially spaced thread projections 72 with lower end portions 72a. Positioned below the thread projections 72 are a diametrically opposite pair of side surface portions 74 (see FIGS. 2 and 8) which are circumferentially ramped and have radially outermost ends which are adjacent a diametrically opposite pair of generally radially extending depressions or pocket areas 76 formed in the locking member outer side surface. An hexagonally cross-sectioned recess 78 axially extends inwardly through the top end 80 of the locking member 34 (see FIGS. 1, 2 and 6) and is configured to drivingly receive an end of a hex-head tool to rotationally insert and remove the locking member into the interlocked base 18 and wear runner 20 as will now be described.

With the wear runner 20 in place on and interlocked with the underlying base 18, the wear runner and base openings 22 and 56 generally aligned, and the pawl body 64 installed in one of the base pockets 62 as previously described, the locking member 34 is downwardly inserted into the openings 22,56 and rotated 90 degrees (in a clockwise direction as viewed from the top in FIG. 2) to cause the downwardly offset leading end portions 72a of the locking member thread projections 72 to enter the base grooves 60a as shown in FIG. 7. This slightly recesses the top side 80 of the locking member 34 downwardly into the wear runner opening 22 as shown in FIG. 6, and the inserted lock member 34 blocks the wear runner 20 from being rearwardly moved relative to base 18 (in the unlocking direction 54 shown in FIG. 2) which would permit upward removal of the wear runner 20 from the base 18.

As the locking member 34 reaches its final rotational position within the aligned openings 22 and 56 (while rotating in the direction 82 shown in FIG. 8), the circumferentially ramped locking member side surface portion 74 shown in FIG. 8 cams the detent member 70 radially outwardly (against the resilient force of the elastomeric pawl body 64) and then permits the detent member 70 to snap into place in the locking member side surface recess 76 as indicated in FIG. 8.

This releasably prevents the inserted locking member 34 from being rotated in an opposite direction to permit its removal from the openings 22 and 56 in a manner permitting the wear runner 20 to move rearwardly relative to the base 18 and become upwardly separated therefrom. When it is desired to remove the wear runner 20 from the base 18, a suitable hex-head tool is inserted into the locking member recess 78 and used to exert a rotational back-out force on the locking member 34. This rotational back-out force causes a side surface 84 of the locking member detent recess 76 to cam the detent member 70 radially outwardly to permit the desired rotational back-out of the locking member from the openings 22 and 56.

Although the locking member projections 72 could have other configurations they preferably have, as previously mentioned herein, generally helical, thread-like configurations. After the locking member 34 is forcibly rotated to cam the detent member 70 radially outwardly, and withdraw the locking member projection leading end portions 72a from the base grooves 60a, a top end portion of the locking member 34 is automatically positioned above the top side 24 of the wear runner 20 to thereby facilitate the manual grasping and upward removal of the locking member 34 from the wear runner and base openings 22 and 56.

While the locking member 34 has been illustrated herein as being interlockable with the base structure 18, via the pawl structure 36 and the locking member projections 72, the locking member could alternatively be interlocked with the wear runner 20 to block rearward movement thereof relative to the base 18. Additionally, the initial interlocking movement of the wear runner 20 relative to the base 18 could be different than that illustratively shown herein. Furthermore, other interlocking structures on the wear runner 20 and the base 18 could be utilized if desired.

As can be seen from the foregoing, the unique rotary locking mechanism incorporated into the wear runner assembly 10 provides it with a variety of advantages over wear runner assemblies of conventional configurations. For example, the lock member 34 does not have to be forcibly struck to remove it and thus permit separation of the wear runner 20 from the base 18. Additionally, since the installed lock member 34 is flush with or slightly recessed into the wear runner 20, it is advantageously shielded from undesirable dislodgement from the assembly during operation of the earth working structure and is protected against becoming seized up on the assembly. Moreover, the locking member 34 may be quite easily and rapidly installed and removed, with such installation and removal being performable with access to only one side of the earth working structure wall portion 14.

The foregoing detailed description is to be clearly understood as being given by way of illustration and example only, the spirit and scope of the present invention being limited solely by the appended claims.

What is claimed is:

1. For use on a surface of an earth working structure, a wear assembly for Inhibiting abrasion wear of said surface, said wear assembly comprising:
   a base structure anchorable to said surface and having a first opening therein, said first opening having a side surface;
   a wear member positionable on said base structure and having a second opening therein, said second opening having a side surface, said wear member being releasably lockable to said base structure, to prevent removal therefrom in a removal direction transverse to said surface, in response to movement of said wear member relative to said base structure in a locking direction parallel to said surface in a manner generally aligning said first and second openings;
   a locking member insertable into the aligned first and second openings to block movement of said wear member relative to said base structure in an unlocking direction opposite from said locking direction, said locking member being rotatable in the aligned first and second openings in a first direction about an axis parallel to said removal direction and being configured to responsively interlock with one of said base structure and said wear member in a manner releasably preventing removal of said locking member from the aligned first and second openings; and
   a holding structure for retaining the Inserted locking member within said first and second openings by releasably preventing rotation of the inserted locking member relative to said base structure and said wear member in a second direction opposite from said first direction.

2. The wear assembly of claim 1 wherein said wear member is a generally cap-shaped wear runner.

3. The wear assembly of claim 1 wherein one of said base structure and said wear member has grooves therein and the other of said base structure and said wear member has tongues thereon which are receivable in said grooves to releasably lock said wear member to said base structure.

4. The wear assembly of claim 3 wherein said base structure has said tongues thereon and said wear member has said grooves therein.

5. The wear assembly of claim 1 wherein said holding aid structure is a detent structure operative to block rotation of the inserted locking member relative to said base structure and said wear member in said second direction.

6. The wear assembly of claim 5 wherein said detent structure includes a first recess formed in the side surface of one of said first and second openings, a second recess formed in said locking member and rotatable into a facing relationship with said first recess when said locking member is rotated in said first direction in said first and second openings, and a resilient pawl structure having a first portion receivable in said first recess, and a second portion receivable in said second recess.

7. The wear assembly of claim 6 wherein said first recess is formed in the side surface of said first opening.

8. The wear assembly of claim 6 wherein said locking member has a ramped side surface portion configured to compress said resilient pawl structure, and then cause said second portion thereof to snap into said second recess, as said locking member is rotated in said first direction in said first and second openings.

9. The wear assembly of claim 8 wherein said second recess has a surface thereon which is positioned and configured to cammingly drive said second portion of said resilient pawl structure out of said second recess in response to forced rotation of said locking member in said second direction within said first and second openings.

10. The wear assembly of claim 1 wherein:
    said locking member has a cylindrical body with an outer side surface, and a plurality of projections formed on said outer side surface, and
    the side surface of one of said first and second openings has a spaced plurality of grooves formed therein and positioned and configured to complementarily receive said projections in response to rotation of said locking member in said first direction within said first and second openings about said axis.

11. The wear assembly of claim 10 wherein said spaced plurality of grooves are formed in the side surface of said first opening.

12. The wear assembly of claim 1 wherein said locking member has a socketed head portion configured to receive a tool operative to rotationally drive said locking member in said second direction within said first and second openings to remove said locking member from said first and second openings.

13. The wear assembly of claim 1 wherein said locking member is configured to be at least slightly recessed into said second opening when said locking member is operatively retained in said first and second openings by said holding structure.

14. For use on a surface of an earth working structure, a wear assembly for inhibiting abrasion wear of said surface, said wear assembly comprising:

a base structure anchorable to said surface and having a first opening therein, said first opening having a side surface;

a wear member positionable on said base structure and having a second opening therein, said second opening having a side surface, said wear member being releasably lockable to said base structure, to prevent removal therefrom in a removal direction transverse to said surface, in response to movement of said wear member relative to said base structure in a locking direction parallel to said surface in a manner generally aligning said first and second openings;

a locking member insertable into the aligned first and second opening to block movement of said wear member relative to said base structure in an unlocking direction opposite from said locking direction, said locking member being rotatable in the aligned first and second openings in a first direction about an axis parallel to said removal direction and being configured to responsively interlock with one of said base structure and said wear member in a manner releasably preventing removal of said locking member from the aligned first and second openings; and a holding structure for retaining the inserted locking member within said first and second openings by releasably preventing rotation of the inserted locking member relative to said base structure and said wear member in a second direction opposite from said first direction, said locking member having a cylindrical body with an outer side surface, and a plurality of projections formed on said outer side surface and axially spiraled about said cylindrical body, and the side surface of said first opening having a spaced plurality of grooves formed therein and positioned and configured to complementarily receive said projections in response to rotation of said locking member in said first direction within said first and second openings about said axis.

15. The wear assembly of claim 14 wherein said plurality of projections are circumferentially spaced from one another.

16. An earth working structure comprising:

a wall portion having a surface thereon; and a wear assembly for inhibiting abrasion wear on said surface, said wear assembly including:

a base structure anchored to said surface and having a first opening therein, said first opening having a side surface, a wear member positioned on said base structure and having a second opening therein, said second opening having a side surface, said wear member being releasably locked to said base structure, in a manner preventing removal therefrom in a removal direction transverse to said surface, with said first and second openings being generally aligned with one another, a locking member received in said first and second openings and blocking movement of said wear member relative to said base structure in an unlocking direction parallel to said surface, said locking member being interlocked with one of said base structure and said wear member in a manner releasably preventing removal of said locking member from said first and second openings, said locking member being rotatable about an axis parallel to said removal direction to permit its removal from said first and second openings, and a holding structure retaining the locking member within said first and second openings by releasably preventing unlocking rotation of said locking member about said axis.

17. The earth working structure of claim 16 wherein said wear member is a generally cap-shaped wear runner.

18. The earth working structure of claim 16 wherein one of said base structure and said wear member has grooves therein and the other of said base structure and said wear member has tongues thereon which are received in said grooves to releasably lock said wear member to said base structure.

19. The earth working structure of claim 18 wherein said base structure has said tongues thereon and said wear member has said grooves therein.

20. The earth working structure of claim 16 wherein said holding structure is a detent structure operative to block rotation of the inserted locking member relative to said base structure and said wear member about said axis.

21. The earth working structure of claim 20 wherein said detent structure includes a first recess formed in the side surface of one of said first and second openings, a second recess formed in said locking member and rotatable into a facing relationship with said first recess when said locking member is rotated in said first and second openings, about said axis, after an initial insertion of said locking member in said first and second openings, and a resilient pawl structure having a first portion received in said first recess, and a second portion received in said second recess.

22. The earth working structure of claim 21 wherein said first recess Is formed in the side surface of said first opening.

23. The earth working structure of claim 21 wherein said locking member has a ramped side surface portion configured to compress said resilient pawl structure, and then cause said second portion thereof to snap into said second recess, as said locking member is rotated in said first and second openings.

24. The earth working structure of claim 23 wherein said second recess has a surface thereon which is positioned and configured to cammingly drive said second portion of said resilient pawl structure out of said second recess in response to forced rotation of said locking member within said first and second openings.

25. The earth working structure of claim 16 wherein:

said locking member has a cylindrical body with an outer side surface, and a plurality of projections formed on said outer side surface, and the side surface of one of said first and second openings has a spaced plurality of grooves formed therein and positioned and configured to complementarily receive said projections in response to rotation of said locking member about said axis within said first and second openings after an initial insertion of said locking member in said first and second openings.

26. The earth working structure of claim 25 wherein said spaced plurality of grooves are formed in the side surface of said first opening.

27. The earth working structure of claim 16 wherein said locking member has a socketed head portion configured to receive a tool operative to rotationally drive said locking member within said first and second openings to permit removal of said locking member from said first and second openings.

28. The earth working structure of claim 16 wherein said locking member is configured to be at least slightly recessed into said second opening when said locking member is operatively retained in said first and second openings by said holding structure.

29. An earth working structure comprising:
   a wall portion having a surface thereon: and
   a wear assembly for inhibiting abrasion wear on said surface, said wear assembly including:
      a base structure anchored to said surface and having a first opening therein, said first opening having a side surface,
      a wear member positioned on said base member and having a second opening therein, said second opening having a side surface, said wear member being releasably locked to said base structure. In a manner preventing removal therefrom in a removal direction transverse to said surface, with said first and second openings being generally aligned with one another,
   a locking member received in said first and second openings and blocking movement of said wear member relative to said base structure in an unlocking direction parallel to said surface, said locking member being interlocked with one of said base structure and said wear member in a manner releasably preventing removal of said locking member from said first and second openings, said locking member being rotatable about an axis parallel to said removal direction to permit its removal from said first and second openings, and
   a holding structure retaining the locking member within said first and second openings by releasably preventing rotation of said locking member about said axis,
   said locking member having a cylindrical body with an outer side surface, and a plurality of projections formed on said outer side surface and axially spiraled about said cylindrical body,
   the side surface of said first opening having a spaced plurality of grooves formed therein and positioned and configured to complementarily receive said projections in response to rotation of said locking member about said axis within said first and second openings after an initial insertion of said locking member in said first and second openings.

30. The earth working apparatus of claim 29 wherein said plurality of projections are circumferentially spaced from one another.

31. For use in releasably preventing separation of an earth working structure wear member from a base with which it is interlocked, a rotary lock member insertable into and rotatable within generally aligned openings in the wear member and base, said rotary lock member comprising:
   a generally cylindrical body having first and second end portions;
   a circumferentially extending projection formed on a side surface portion of said body between said first and second end portions;
   a circumferentially ramped recess formed on a side of said first end portion and having a radially outermost end; and
   a generally radially extending pocket area formed on said side of said first end portion at said radially outermost end of said circumferentially ramped recess, said circumferentially ramped recess being axially spaced apart from said circumferentially extending projection.

32. The rotary lock member of claim 31 wherein said circumferentially extending projection is axially spiraled about said generally cylindrical body.

33. For use in releasably preventing separation of an earth working structure wear member from a base with which it is interlocked, a rotary lock member insertable into and rotatable within generally aligned openings in the wear member and base, said rotary lock member comprising:
   a generally cylindrical body having first and second end portions;
   a circumferentially extending projection formed on a side surface portion of said body between said first and second end portions;
   a circumferentially ramped recess formed on a side of said first end portion and having a radially outermost end; and
   a generally radially extending pocket area formed on said side of said first end portion at said radially outermost end of said circumferentially ramped recess,
   said second end portion having an outer end surface with a noncircularly cross-sectioned, axially extending recess formed therein.

\* \* \* \* \*